United States Patent Office 2,882,420
Patented Apr. 14, 1959

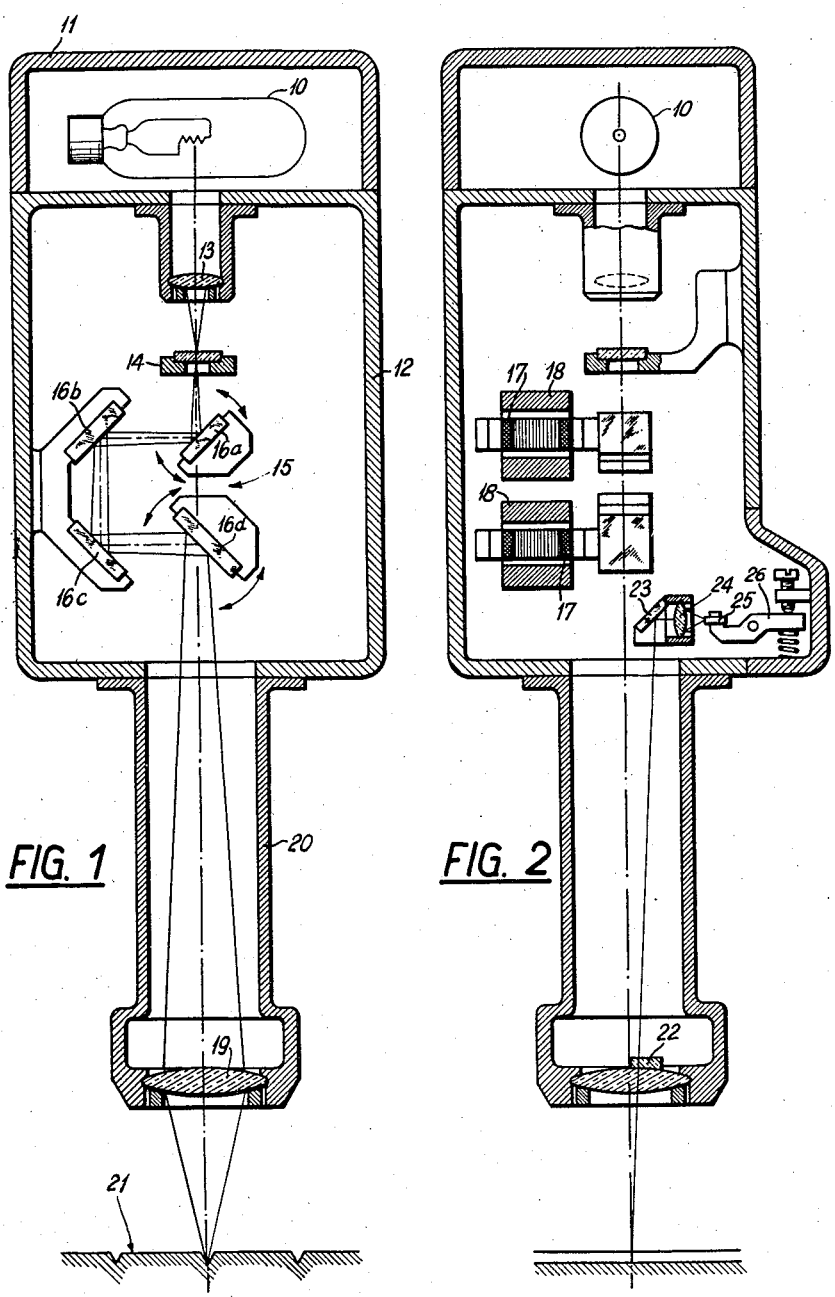

2,882,420

PHOTO-ELECTRIC MICROSCOPE

Miron Koulicovitch, Geneva, Switzerland, assignor to Societe Genevoise d'Instruments de Physique, Geneva, Switzerland, a corporation of Switzerland Application November 7, 1957, Serial No. 695,074

Claims priority, application Switzerland November 7, 1956

2 Claims. (Cl. 250—230)

The present invention has for its object a photo-electric microscope of the type serving in arrangements for defining photo-electrically the location of a line forming part of the scale on a highly accurate rule, as shown for instance in the arrangements disclosed in the Swiss Patents Nos. 281,171 and 297,676.

Microscopes of this type are provided with a source of light forming an illuminating beam producing through an objective an image of said source of light on the scale-carrying surface, said source of light being associated with an optic deflector subjected to undamped oscillations imparting the lumionus beam with an oscillating movement which makes it sweep the scale, while a photo-cell, sensitive to the contrast between the intensity of the rays reflected by the line the position of which is to be defined and that of the rays reflected by the surface adjacent said line is subjected to the action of said rays.

In such microscopes, the deflector is generally constituted by a sheet of glass extending perpendicularly to the optic axis of the microscope and carried by elastic supports, while it is subjected to undamped oscillations to either side of said optic axis. In order to cut out any straining of the elastic suspension means, the amplitude of the oscillations should remain small while retaining however a sufficient value so that the rocking system may not be subjected to any substantial influence of mechanical vibrations. Thus the amplitude of the oscillations in such microscopes is defined at its optimum value for which the sweeping stroke of the luminous beam and the magnification provided by the microscope are also well defined.

As a matter of fact, the reading system being subjected to the time intervals elapsed between the successive pulses produced by the photo-cell, its indications or its magnification for a same error in the location of the line of the rule scale to be checked are reversely proportional to the amplitude of the sweeping stroke of the luminous beam.

It may be of interest in certain cases to modify the amplitude of the sweeping stroke and the value of the magnification, which modification cannot be obtained with the microscopes proposed hitherto.

The improved microscope forming the object of the invention allows obtaining a variable modification through the fact that its deflector is constituted by a plurality of mirrors of which two at least are arranged on the optic axis of the microscope and are designed so as to be capable of being subjected independently of each other and selectively to undamped oscillations of equal amplitudes, this arrangement allowing a comparative long sweeping stroke for the luminous beam associated with a comparatively small magnification through the rocking of the oscillating mirror which is the most remote from the source of light, and reversely when the oscillating mirror nearest the source is caused to rock.

The accompanying drawings illustrate by way of example a preferred embodiment of the improved microscope.

Figs. 1 and 2 are axial cross-sections in two vertical orthogonal planes of this embodiment.

The microscope illustrated includes an incandescent bulb 10 fitted in a compartment 11 forming the upper section of an elongated casing 12 inside which are enclosed a lens 13, a diaphragm 14 and a deflector 15.

The lens 13 concentrates a fraction of the beam produced by the bulb into the narrow slot of the diaphragm 14, so as to form a linear source of light.

The deflector 15 is constituted by four mirrors 16 sloping at 45° with reference to the axis of the microscope so as to change four times the direction of the optic path followed by the incoming beam, and to return it finally into its original direction. The mirrors 16b and 16c are stationary whereas the mirrors 16a and 16d are arranged in the optic axis of the microscope and are fitted on elastic arms carried by the cooperating windings 17. The latter are connected with the mains through the agency of a switch which is not illustrated and which allows, in principle, feeding only one winding at a time. Said windings which are located in the field of the corresponding permanent magnets 18 provide for the oscillation of said mirrors under equal amplitudes when they are fed from the mains.

Selective means which are not illustrated allow locking the two mirrors in their inoperative positions for which their reflecting surfaces are parallel respectively with the surfaces of the stationary mirrors 16b and 16c facing them.

An objective 19 fitted in the opening of a sleeve 20 at the lower end of the main casing 12 forms on the surface of the rule 21 an image of the diaphragm slot 14 which is parallel with the lines of the scale on said rule.

According as to whether the mirror 16a or the mirror 16d rocks, said image sweeps areas which are longer or shorter since the amplitudes of the oscillations of the two mirrors are equal and the optical distances separating them from the surface of the rule are different. Consequently, the mirror 16d, when it rocks, provides a lesser magnification than the mirror 16a.

The beam reflected by the surface thus swept is partly deflected by the prism 22 fitted over a part of the objective lens 19 and the deflected rays impinge on the plane mirror 23. The latter directs the luminous beam onto a lens 24 which concentrates it to form a focus on the sensitive surface of a photo-cell 25. Said surface of the photo-cell is fitted on an adjustable support 26 which provides for an accurate adjustment of its position.

What I claim is:

1. A photo-electric microscope for the examination of the lines of a scale carrying surface, comprising a linear illuminated element, a projection objective adapted to focus the beam produced by said linear element onto the scale-carrying surface, an optic deflector including a series of reflecting surfaces adapted to reflect said beam onto the objective, the first reflecting surface facing said source and the last surface facing the objective, means for independently and selectively imparting an oscillating movement to the first and to the last reflecting surface round a line perpendicular to the optic axis of the beam at a same predetermined amplitude and a photo-cell subjected to the contrast between the rays of the beam reflected by the scale line to be defined and that of the rays reflected by the area of the surface adjacent said line.

2. A photo-electric microscope for the examination of the lines of a scale-carrying surface, comprising a linear illuminated element, a projection objective adapted to focus the beam produced by said linear element onto the scale-carrying surface, an optic deflector including a series of reflecting surfaces adapted to reflect said beam onto the objective, the first reflecting surface facing said source and the last surface facing the objective, means for independently and selectively imparting an oscillating movement to the first and to the last reflecting surface round a line perpendicular to the optic axis of the beam at a same predetermined amplitude, means for locking each of the first and last mirrors selectively in its inoperative medial position and a photo-cell subjected to the contrast between the rays of the beam reflected by the scale line to be defined and that of the rays reflected by the area of the surface adjacent said line.

References Cited in the file of this patent

UNITED STATES PATENTS

| | | |
|---|---|---|
| 2,026,330 | Tauschek | Dec. 31, 1935 |
| 2,444,560 | Feldt et al. | July 6, 1948 |
| 2,543,848 | Hanson | Mar. 6, 1951 |

FOREIGN PATENTS

| | | |
|---|---|---|
| 281,171 | Switzerland | June 3, 1952 |